(Model.)
F. M. LOVE.
WIRE FENCE MACHINE.
No. 346,595. Patented Aug. 3, 1886.
Fig. 1    Fig. 2    Fig. 3    Fig. 4
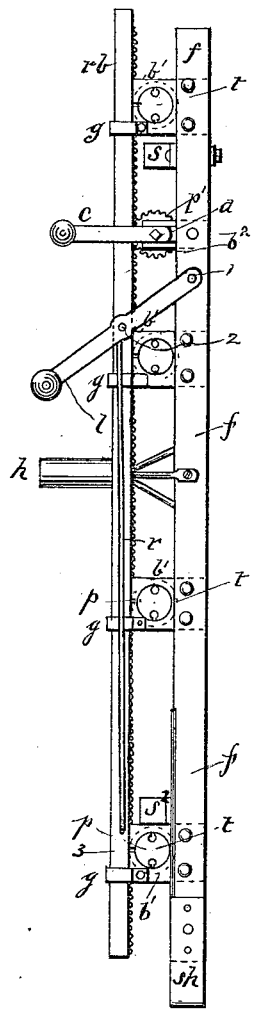
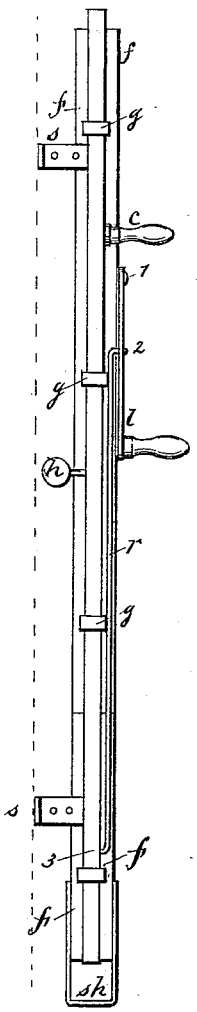
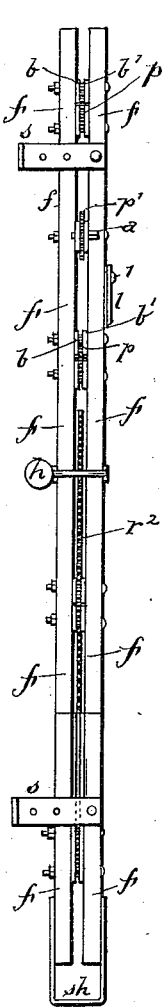
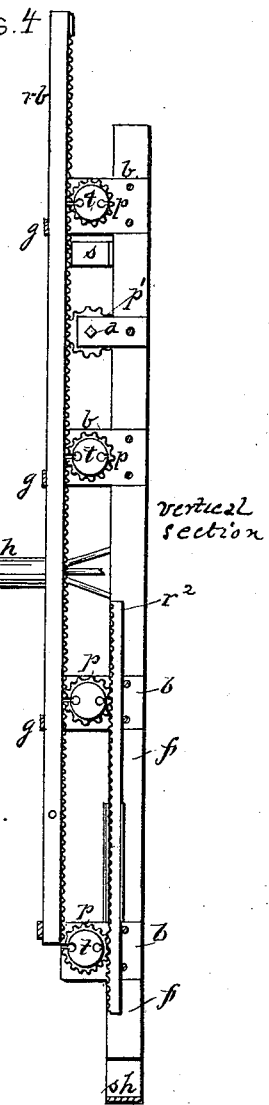
Fig. 5
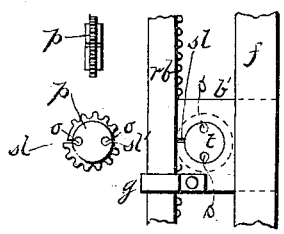
WITNESSES.
Robert Haase
Wm. W. Spencer
INVENTOR.
Francis M. Love
By C. P. Jacobs
Atty.
N. PETERS, Photo-Lithographer, Washington, D. C.

UNITED STATES PATENT OFFICE.

FRANCIS M. LOVE, OF SHELBYVILLE, INDIANA, ASSIGNOR OF ONE-HALF TO SAMUEL C. LOVE, OF SAME PLACE.

WIRE-FENCE MACHINE.

SPECIFICATION forming part of Letters Patent No. 346,595, dated August 3, 1886.

Application filed April 9, 1886. Serial No. 198,341. (Model.)

*To all whom it may concern:*

Be it known that I, FRANCIS M. LOVE, a resident of Shelbyville, Shelby county, Indiana, have made certain new and useful Improvements in Wire-Fence Machines, a description of which is set forth in the following specification, reference being made to the accompanying drawings, in the several figures of which like letters indicate like parts.

My invention consists in an improved mechanism for twisting the wires around the slats of a combined fence, and for guiding and spacing the same, and will be understood from the following description.

In the drawings, Figure 1 represents a side view of my device. Fig. 2 is an edge view of the same. Fig. 3 is also an edge view with the rack-bar removed. Fig. 4 is a side view, the front side removed, showing one of the rack-bars at its highest and the other at its lowest point. Fig. 5 is a detail view of one of the twisters, showing the pinion and boxing.

In detail, $f$ is the frame-work made of two parallel bars or pieces connected at the bottom by an adjustable shoe, $sh$, and to which the spacers $s$ are fastened, for holding the slats in position while the wire is being twisted around them, and having also a handle, $h$, fastened to one side for lifting the machine. The spacers are adjustable in the holes of the longest arm, which is secured by bolts passing between the bars of the frame $f$. A secondary toothed rack-bar, $r^2$, about half the length of the frame $f$, is movable vertically in slides between the bars of this frame at its lower end. This rack-bar is made to engage with the pinions of the two lower twisters, so as to be moved by them when the rack-bar $rb$ has been lifted up far enough to free it from engagement with the lower pinion, as shown in Fig. 4, thus allowing wires to be twisted close to the ground. Opposite the frame $f$ is a full-length rack-bar, $rb$, sliding vertically in metal guides $g$, bolted to the boxings $b\ b'$ of the twisters, and operated by a lever, $l$, which is pivoted at 1 to the side of the frame $f$, at 2, near its center, to a connecting-rod, $r$, which is in turn pivoted at 3 to the rack-bar $rb$. By moving this lever $l$ up and down it is obvious the rack-bar $rb$ is moved in the same manner, and the twisters are revolved, inasmuch as the central portion of each of these twisters $t$ is composed of a toothed pinion, $p$, which engages with the teeth of the rack-bar $rb$. The wire to be twisted passes through openings $o$ in these twisters in the usual manner.

In addition the rack-bar may be operated, if desired, by a crank, $c$, which revolves an independent pinion, $p'$, which is carried on an arbor, $a$, having bearings in the sides of a bracket, $b^2$, which is fastened to the frame $f$, the teeth of this independent pinion being adapted to engage with the teeth of the rack-bar $rb$. By turning the crank $c$, therefore, the rack-bar is given an up-and-down movement.

The twisters $t$ are carried between boxing-plates $b\ b'$, bolted between the parts of the frame $f$, the peripheries of the outside plates of the twisters revolving in corresponding openings in these boxing-plates, while the central portion of the twisters is of larger diameter, and is toothed so as to form the pinion $p$. This central portion prevents the twister from falling out of the openings in the boxing on either side.

The machine will operate more easily if one tooth on each side be cut out of the lower pinion, so that when the rack-bar $rb$ is about to free itself from engagement with that pinion the other will readily engage it without choking the mechanism.

The openings $o$ in the twisters are made large enough to allow a spliced wire to pass through, and at the edge of these openings small slots, $sl$, are cut through to the circumference, and a corresponding slot, $sl'$, is made in one of the boxing-plates, to allow the wires to be passed through the twisters.

When desired, either the lever $l$ and its connecting-rod $r$ or the crank $c$ and the bracket and pinion $p'$ may be entirely removed, and either one operated separately, or both may be operated together. In the latter case the crank $c$ would be shifted to the opposite side.

What I claim, and desire to secure by Letters Patent, is the following:

1. In a wire-fence machine, a series of twisters, $t$, having toothed central portions, $p$, engaging with the teeth of the rack-bar $rb$, the twisters carried in boxing-plates connected to the frame $f$, the rack-bar moving in suitable guides, $g$, and the lever $l$ and connecting-rod $r$, for actuating the same, all combined substantially as described.

2. In a wire-fence machine, the frame $f$, composed of two parts, carrying the twisters $t$, having central toothed portions, $p$, engaging with the teeth of the rack-bar $rb$ on one side, and the two lower ones engaging with the teeth of a secondary rack-bar, $r^2$, moving up and down in the frame $f$, with mechanism for actuating the same, all combined substantially as described.

3. In a wire-fence machine, the frame $f$, carrying the twisters $t$, having bearings in the boxing-plates $b$ $b'$, the central portion of the twisters toothed to engage with the teeth of the rack-bar $rb$, such rack-bar moving in guides and provided with lever or crank mechanism for actuating the same, the adjustable spacers $s$, connected to the frame $f$, the shoe $sh$, and the secondary rack-bar $r^2$, having a sliding movement in the frame $f$, and engaging with the lower pinions, all combined substantially as described.

In witness whereof I have hereunto set my hand this 6th day of April, 1886.

F. M. LOVE.

Witnesses:
C. P. JACOBS,
ROBERT HAASE.